United States Patent
Nüssli

(10) Patent No.: US 7,343,951 B2
(45) Date of Patent: Mar. 18, 2008

(54) INSTALLATION FOR MACHINING CONTINUOUS MATERIALS COMPRISING A MODULAR DEVICE FOR APPLYING FLUIDS ON SAID CONTINUOUS MATERIALS

(75) Inventor: Rudolph Nüssli, Chur (CH)

(73) Assignee: Solipat AG, Zug (CH)

( * ) Notice: Subject to any disclaimer, the term of this patent is extended or adjusted under 35 U.S.C. 154(b) by 92 days.

(21) Appl. No.: 10/531,472

(22) PCT Filed: Oct. 15, 2003

(86) PCT No.: PCT/EP03/11416

§ 371 (c)(1),
(2), (4) Date: Apr. 15, 2005

(87) PCT Pub. No.: WO2004/037438

PCT Pub. Date: May 6, 2004

(65) Prior Publication Data

US 2006/0011302 A1    Jan. 19, 2006

(30) Foreign Application Priority Data

Oct. 18, 2002    (EP)    ................... 02023366

(51) Int. Cl.
| | |
|---|---|
| B28B 19/00 | (2006.01) |
| B32B 37/00 | (2006.01) |
| B32B 39/00 | (2006.01) |
| B29C 65/54 | (2006.01) |
| B05C 1/04 | (2006.01) |
| B05C 5/00 | (2006.01) |
| B05B 7/00 | (2006.01) |

(52) U.S. Cl. ............ 156/390; 156/538; 156/547; 156/578; 118/200; 118/232; 118/300; 118/305

(58) Field of Classification Search ............... 156/242, 156/244.16, 277, 290, 291, 307.1, 307.3, 156/307.7, 390, 391, 578, 538, 547; 118/200, 118/232, 300, 305
See application file for complete search history.

(56) References Cited

U.S. PATENT DOCUMENTS

| | | |
|---|---|---|
| 3,916,824 A | 11/1975 | Knodel et al. |
| 3,945,781 A | 3/1976 | Doleman |
| 4,055,453 A * | 10/1977 | Tajima et al. ............... 156/279 |
| 4,732,800 A | 3/1988 | Groshens |
| 5,536,313 A | 7/1996 | Watanabe et al. |
| 5,609,920 A | 3/1997 | Riepenhausen |
| 5,743,964 A | 4/1998 | Pankake |

(Continued)

FOREIGN PATENT DOCUMENTS

DE    19960748    6/2001

(Continued)

Primary Examiner—Philip Tucker
Assistant Examiner—Chan Sing Po
(74) Attorney, Agent, or Firm—Shoemaker and Mattare

(57) ABSTRACT

The invention concerns an installation for machining (1) a continuous material (2), comprising a device for applying fluids, for example plastic substances and/or fluid adhesives, in the form of a surface coat at least partly on the continuous material (2) directly applied or by transfer. Such installations are particularly used for laminating a continuous material and one or more substrates. The invention is characterized in that the application device (A) mounted in the deflecting and/or pressing roll (4) is an interchangeable modular unit.

10 Claims, 2 Drawing Sheets

U.S. PATENT DOCUMENTS

| | | | |
|---|---|---|---|
| 5,860,360 A * | 1/1999 | Lane et al. | 101/376 |
| 6,004,680 A * | 12/1999 | Abed et al. | 428/451 |
| 6,126,771 A | 10/2000 | Mosburger et al. | |
| 6,565,697 B1 * | 5/2003 | Maercklein | 156/289 |
| 6,703,441 B2 * | 3/2004 | Husemann et al. | 524/558 |

FOREIGN PATENT DOCUMENTS

| | | |
|---|---|---|
| WO | WO99/41064 | 8/1999 |

* cited by examiner

INSTALLATION FOR MACHINING CONTINUOUS MATERIALS COMPRISING A MODULAR DEVICE FOR APPLYING FLUIDS ON SAID CONTINUOUS MATERIALS

The present invention relates to an installation for processing continuous materials, comprising a device for applying fluids, for example free-flowing plastic and/or adhesive compounds, with the effect of at least partial surface coatings of continuous materials in accordance with a direct or a transfer printing principle. Such installations are normally used for laminating continuous materials and one or more substrates.

Apparatuses for surface coating in accordance with a direct or a transfer printing principle are known, for example from the documents CH 648 497 A5 and DE 39 00 297 A1. However, the common disadvantage in all the known apparatuses to date is that the application units respectively used are well-suited to specific substrates and/or fluids but are less suitable or even not suitable at all for others. Therefore, the areas of application of such a processing installation are limited.

It is therefore an object of the present invention to avoid the disadvantages of the known, in particular therefore to provide a device for applying fluids to a continuous material with which various application techniques can be implemented.

According to the invention, this object is achieved by an installation for processing continuous materials, comprising a device for applying fluids to a continuous material according to the features of the independent patent claims.

The processing installation according to the invention is used for applying fluids to a continuous material. Here and in the following text, fluid is understood to mean a compound which is capable of flowing under the application conditions. In this case, these can be plastics or else other materials suitable for coating. Also provided in particular are adhesives, preferably hot-melt adhesives and two-component adhesives. The functionality of the fluid can furthermore firstly consist in the coating per se and/or can serve to bring about a connection between the continuous material and a first and/or second substrate to be supplied subsequently. Here and in the following text, continuous material is understood to mean a two-dimensional structure, in particular of a textile nature, but also, for example, plastic films, thin paper sheets or other materials.

According to the invention, the continuous material, for example on a roll, is supplied to the processing installation via a conventional feed arrangement. The continuous material then passes through a roll arrangement for guiding the continuous material. This roll arrangement comprises at least one deflection and/or pressure roll for guiding the continuous material in the region of the application device. It is important to the invention that the application device provided in the region of this deflection and/or pressure roll is constructed modularly as a structural unit. Here and in the following text, modularly or structural unit is to be understood to mean that the respective application device can be added to the processing installation as a unit and removed again without further complicated rebuilding of the processing installation being necessarily. In this case, it is important that the deflection and/or pressure roll provided in the region of the application device remains on the processing installation independently of the respective application device used in a modular fashion, that is to say said roll is compatible with all the application devices provided and marks the "dividing line" between the application unit, which can be replaced in a modular fashion, and the processing installation. The continuous material to which the fluid is to be applied is in this case always guided past the application device by means of the aforesaid deflection and/or pressure roll in such a way that application of the fluid to the continuous material is possible with various application devices. This permits a high degree of flexibility of the method sequence on the basis of the respective application, since time-consuming and costly rebuilding of the entire processing installation is no longer needed. The conversion to a different application technique can now be carried out by the comparatively simple replacement of complete, modular application devices.

In a preferred embodiment, a modular application device is provided which has a slot-like application region. In this case, this application region is arranged in the wrap region of the deflection and/or pressure roll, applying the fluid directly to the continuous material. In particular, in this case the slot-like application region can be arranged so as to rest directly, at right angles or obliquely, on the continuous material, if appropriate exerting a suitable pressure on the deflection and/or pressure roll via the continuous material. Here and in the following text, a suitable pressure is understood to mean a pressure which improves the uniform application of the fluid without the friction, required for this purpose, between the application device and the continuous material being unnecessarily high. However, it is not essential to the invention that the application region rests on the continuous material to which the fluid is to be applied. Instead, an application region arranged freely above the continuous material is also expressly possible. In a particularly preferred embodiment, the slot-like application region is a fishtail die.

In a further preferred embodiment, a modular application device is provided which applies the fluid to the continuous material in a transfer printing method via a system comprising at least two rolls. In this case, the two rolls can be arranged both beside each other and one above the other, and the direction of rotation of the two rolls can be both in the same direction and in the opposite direction. It is merely important that the fluid is applied to the continuous material via the roll of the application device that faces the deflection and/or pressure roll.

In a further suitable embodiment, a modular application device is provided which conveys the fluid via a profiled roll, the fluid being transported substantially via depressions within the roll. In this case, the application of the fluid to the continuous material is carried out substantially in accordance with the profiling of the profiled roll, in particular in a point-like manner.

According to a further preferred embodiment, a modular application device is provided which applies the fluid to the continuous material via a finely distributing spraying apparatus. Of course, the spraying apparatus, in particular the spray head, is in this case always dimensioned such that it is suitable for the specific characteristics of the respective fluid and efficient spraying is ensured. This applies in particular when the fluid to be applied is an adhesive.

In a further preferred embodiment and in a modification of the previous embodiment, a modular application device is provided which applies the fluid to the continuous material via a coarsely distributing casting apparatus. Such an application device is useful in particular in the case of more viscid fluids, which may not be sprayed efficiently because of an increased viscosity.

Of course, within the processing installation, following application of the fluid to the continuous material in accordance with one of the embodiments described above, an arrangement for supplying a first substrate can be integrated, for example in the case of laminating the continuous material with one or more substrates. In this case, the fluid used is typically one which is suitable for producing a connection between the continuous material and the first substrate, preferably an adhesive, in particular a hot-melt adhesive.

According to a further preferred configuration of the invention, after it has been connected to a first substrate, the continuous material is conveyed onward in the processing installation and supplied to a further deflection and/or pressure roll. The second deflection and/or pressure roll is arranged in the region of a second, modular application device. In analogy with the embodiments already described, here too all the above embodiments of a modular application device can again be mounted. Of course, depending on the guidance of the composite comprising continuous material and first substrate, the application of a second fluid can be made to the side of the continuous material or else to the side of the first substrate. Furthermore, the use of different fluids for connecting the first and the second substrate is of course also possible, as long as this does not result in any compatibility problems that are undesirable for the respective application. By means of supplying a possible second substrate, a connection either to the continuous material or to the first substrate can now be brought about. By means of the replaceability of both application devices, achieved according to the invention, the result is thus high flexibility in the production process, in particular of multilayer laminates, since the application devices can easily be adapted to the fluid to be applied, depending on the laminate to be produced.

The invention will be explained below using drawings, in which.

Figure 1:
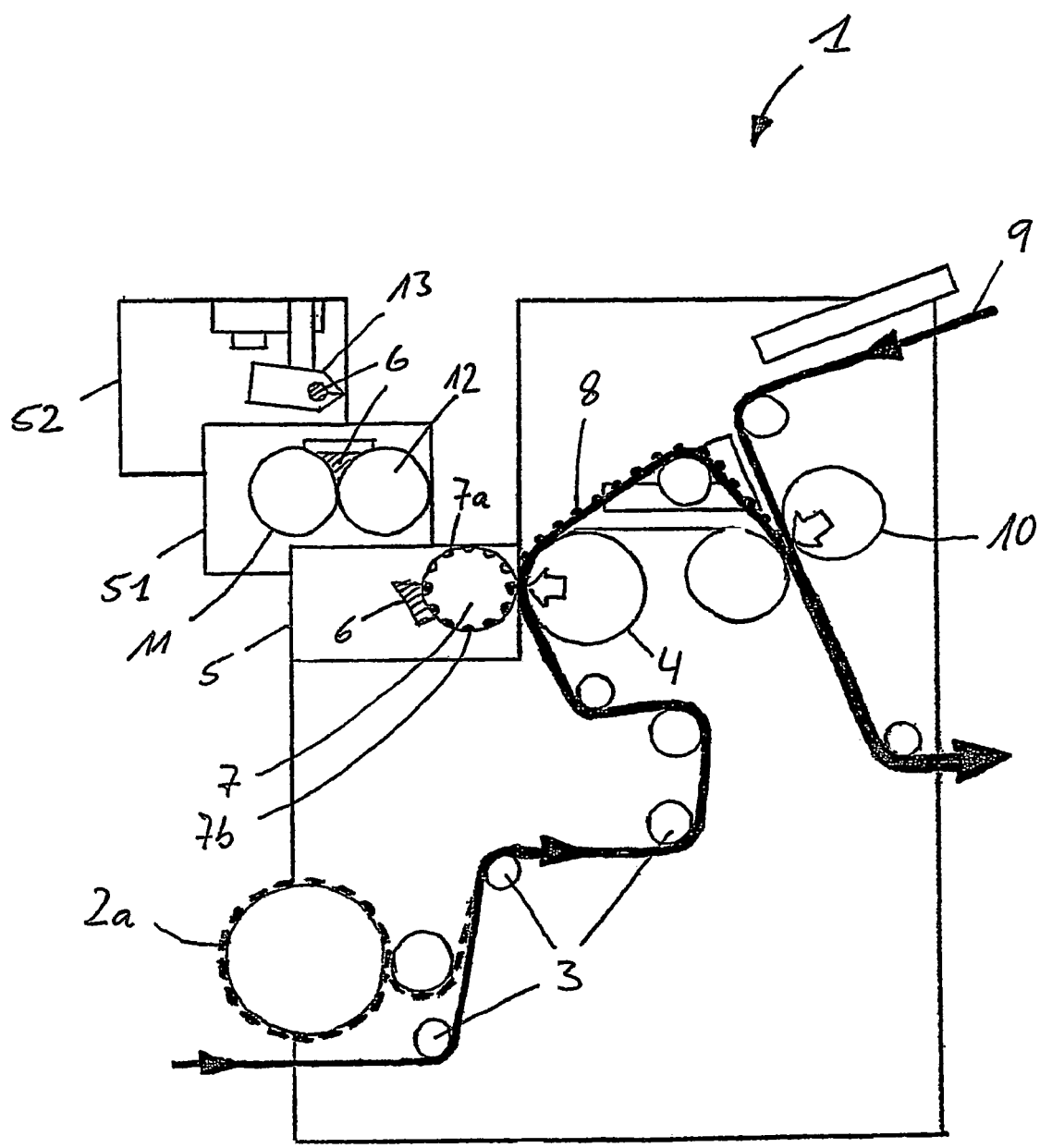
FIG. 1 shows a diagram of the processing installation according to the invention with various replaceable, modular application devices.

FIG. 1 shows a processing installation 1 according to the invention which, in a first processing step, is used to apply a fluid 6 to a continuous material 2. The continuous material 2 may optionally also be supplied to the processing installation 1 as roll material 2a. The continuous material 2 then runs through a roll arrangement 3 for guiding the continuous material. This roll arrangement 3 also comprises at least one deflection and/or pressure roll 4 for guiding the continuous material in the region of an application device A. This application device A is of modular construction here, so that it can be replaced without complicated rebuilding of the processing installation, for example by the application devices 51 or 52. In the example shown, an application device 5 has been installed which conveys the fluid 6 via a profiled roll 7. This profiled roll 7 has depressions 7a, which can be filled with the fluid 6, 7b. In accordance with a transfer printing method, the continuous material 2 running through between the deflection and/or pressure roll 4 and the profiled roll 7 is printed with the fluid 6 in the depressions 7b of the profiled roll 7. Following the contact between the continuous material 2 and the profiled roll 7, the fluid 6 is located on the continuous material 2 in accordance with the pattern of the profile of the profiled roll 7, for example in point-like regions 8. Given suitable selection of the fluid 6, for example therefore in the case of an adhesive, a first substrate 9 can subsequently be supplied, for example in order to be laminated with the continuous material 2. In the region of a further deflection and/or pressure roll 10, the substrate is then brought into contact with the side of the continuous material 2 coated with the fluid 6 and is then conveyed onward with the latter.

FIG. 1 also shows, as examples, two further modular application devices 51 and 52, which can be mounted as a replacement for the application device 5. Irrespective of the modular application device which is mounted in each case, the deflection and/or pressure roll 4 is always used to guide the continuous material 2 past the respective modular application device in such a way that it is possible to apply the fluid 6 to the continuous material 2. The application device 51 is, for example, a system comprising at least two rolls 11 and 12, in which the fluid 6 is applied to the continuous material 2 via a transfer printing method. The two rolls 11 and 12 can in this case be arranged both beside each other and one above the other, and the direction of rotation of the two rolls 11 and 12 can be both the same and opposite.

The modular application device 52 has an apparatus 13 with a slot-like region for applying the fluid 6. In particular, the apparatus 13 can also be a fishtail die 13a.

Figure 2:
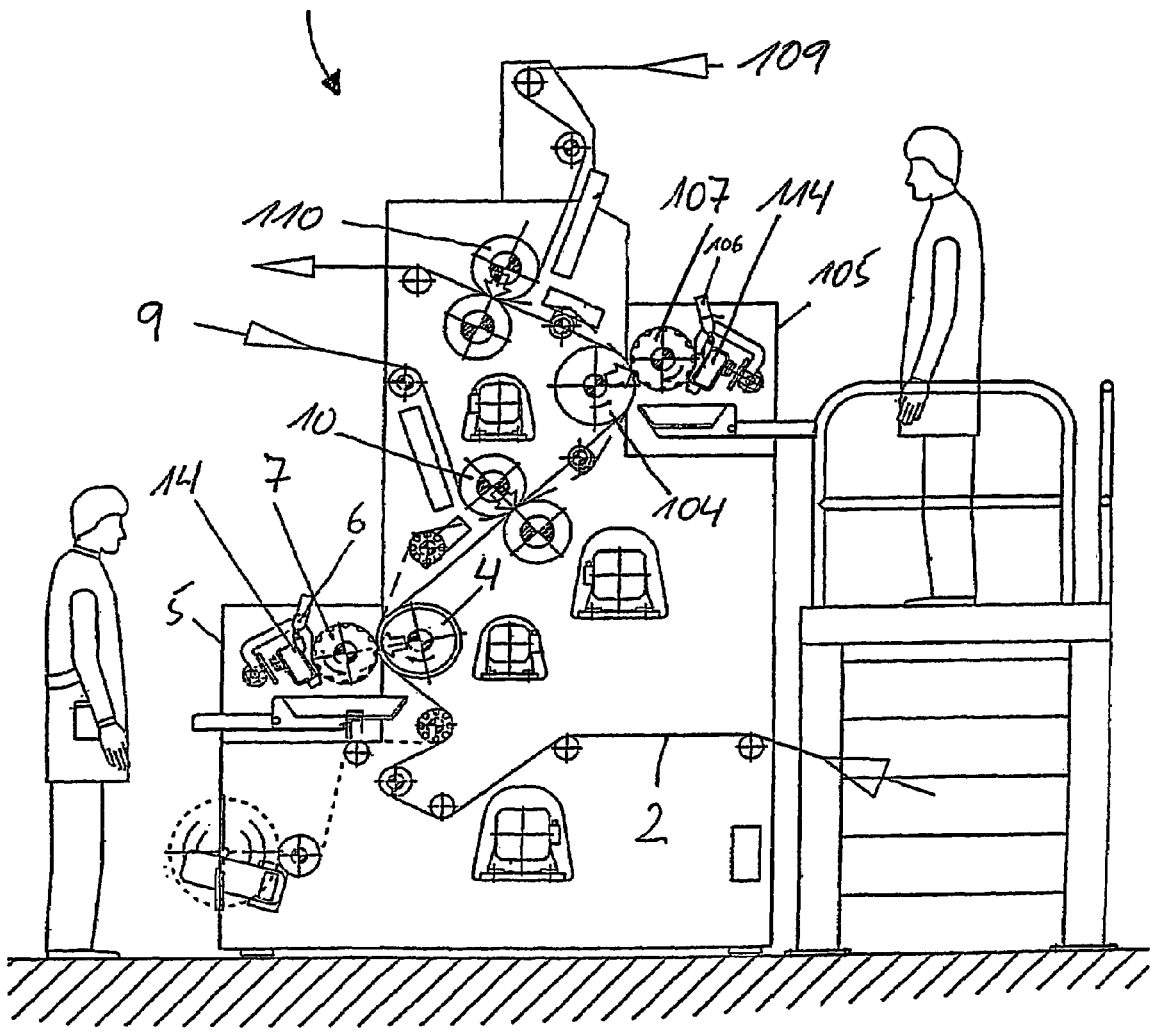
FIG. 2 shows a diagram of the processing installation according to the invention with two replaceable, modular application devices.

FIG. 2 shows an apparatus 100 according to the invention, in which two modular application devices 5 and 105 are mounted.

Both application devices 5 and 105 each contain a profiled roll 7 and 107, respectively, which are fed with the fluid 6 and 106 by an apparatus 14 and 114 in each case. The fluids 6 and 106 can be the same and also different kinds of fluids. The application devices 5 and 105 are likewise shown as profiled rolls, merely by way of example. According to the invention, all other modular application devices described above can also be mounted in its place, that is to say devices 5, 51, 52, 53, 54 as the first application device A, and, in a corresponding way in analogy, 105, 151, 152, 153 and 154 as the second application device A2. A first substrate 9 is supplied in a procedure analogous to that described in FIG. 1. The continuous material 2 to which the fluid 6 is applied is brought into contact via the deflection and/or pressure roll 10. The continuous material 2 and the first substrate 9 are then transported onward together and, in the wrap region of the deflection and/or pressure roll 104, have a further fluid 106 applied to them via a second modular application device A2. In the example shown, the application with the second fluid 106 is carried out on the side of the continuous material 2. Of course, according to the invention, an application of the second fluid 106 to the side of the first substrate 9 is also possible, however. In the further method sequence, a second substrate 109 can be supplied, which is brought into contact with the first substrate 9 or the continuous material 2 via a further deflection and/or pressure roll and is guided onward together with the former. By using the apparatus according to the invention shown, for example during the production of a three-layer laminate, it is for the first time possible to replace the modular application devices A and A2 without difficulty and thus to adapt the application principle to the laminate to be produced in each case.

The invention claimed is:

1. An installation for processing continuous materials, said installation comprising
   a roll arrangement for guiding the continuous material, having a deflection and/or pressure roll and
   a plurality of fluid application modules, each adapted to interact with said deflection and/or pressure roll, for applying a fluid to the continuous material, each said application module being an independent structural unit which can be removably connected to the processing installation and subsequently replaced by another one of said modules for easily adapting the application modules to the fluid to be applied, the deflection and/or pressure roll being arranged on the processing installation in such a way that, when the application module is removed from the installation, the deflection and/or pressure roll remains on the processing installation and said modules having different fluid application principles.

2. The installation as claimed in claim 1, wherein the application module is a structural unit having a slot-like application region, which is arranged in the wrap region of the continuous material on the deflection and/or pressure roll for applying the fluid.

3. The installation as claimed in claim 2, wherein the slot-like application region comprises a fishtail die.

4. The installation as claimed in claim 1, wherein the application module is a structural unit which has at least one application roll for conveying the fluid, which roll is arranged in the wrap region of the continuous material on the deflection and/or pressure roll.

5. The installation as claimed in claim 4, wherein the application roll has a profiled surface, which in particular has depressions for conveying the fluid.

6. The installation as claimed in claim 1, wherein the application module is a structural unit having a spraying apparatus which applies the fluid and is arranged in the wrap region of the continuous material on the deflection and/or pressure roll.

7. The installation as claimed in claim 1, wherein the application module is a structural unit having a casting apparatus which applies the fluid and is arranged in the wrap region of the continuous material on the deflection and/or pressure roll.

8. The installation as claimed in claim 1, further comprising an arrangement for supplying a substrate downstream of the application module, by means of which arrangement the substrate can be laminated with the continuous material by means of the fluid applied.

9. The installation as claimed in claim 1, further comprising an additional application module for a fluid, which is connected downstream of the first application module, is constructed as a structural unit and is separably connected to the processing installation, a second deflection and/or pressure roll being arranged on the installation in such a way that, when the additional application module is separated, the second deflection and/or pressure roll remains on the processing installation.

10. The installation as claimed in claim 9, further comprising an arrangement for supplying a second substrate downstream of the additional modular application module, by means of which arrangement the second substrate can be laminated with the continuous material or the first substrate by means of the fluid applied.

* * * * *